United States Patent
Irazu Echeverria et al.

(10) Patent No.: US 9,539,791 B2
(45) Date of Patent: Jan. 10, 2017

(54) METAL AND MAGNETORHEOLOGICAL MULTI-PANEL

(71) Applicant: Recubrimientos Plasticos, S.A., Astrain (ES)

(72) Inventors: Leire Irazu Echeverria, Astrain (ES); Maria Jesus Elejabarrieta Olabarri, Astrain (ES); Carlos Tapia De La Fuente, Astrain (ES); Yolanda Garces Inunez, Astrain (ES); Jose Mari Erroba Esquiroz, Astrain (ES); Beatriz Fernandez Resano, Astrain (ES); Beatriz Lerga Flamarique, Astrain (ES)

(73) Assignee: RECUBRIMIENTOS PLASTICOS, S.A., Astrain (Navarra) (ES)

( * ) Notice: Subject to any disclaimer, the term of this patent is extended or adjusted under 35 U.S.C. 154(b) by 0 days.

(21) Appl. No.: 14/746,211

(22) Filed: Jun. 22, 2015

(65) Prior Publication Data
US 2016/0023440 A1   Jan. 28, 2016

(30) Foreign Application Priority Data
Jul. 24, 2014   (ES) .................... 201431113

(51) Int. Cl.
*B32B 15/08*   (2006.01)
*B32B 15/095*   (2006.01)
(Continued)

(52) U.S. Cl.
CPC .............. *B32B 15/08* (2013.01); *B32B 7/12* (2013.01); *B32B 15/082* (2013.01); *B32B 15/09* (2013.01);
(Continued)

(58) Field of Classification Search
None
See application file for complete search history.

(56) References Cited

U.S. PATENT DOCUMENTS

| | | | | |
|---|---|---|---|---|
| 2005/0107870 A1* | 5/2005 | Wang | .............. | A61L 31/10 623/1.44 |
| 2009/0053512 A1* | 2/2009 | Pyun | .............. | G11B 5/712 428/336 |
| 2013/0004664 A1* | 1/2013 | Agrawal | .............. | E21B 41/00 427/192 |

FOREIGN PATENT DOCUMENTS

JP         06079824 A   *   3/1994

OTHER PUBLICATIONS

Machine_English_Translation_JP_06079824_A; Fukuura, Yukio; Composite Type Vibration-Damping Metal Plate; Mar. 22, 1994; JPO; whole document.*

* cited by examiner

*Primary Examiner* — Tahseen N Khan
(74) *Attorney, Agent, or Firm* — Lucas & Mercanti, LLP

(57) ABSTRACT

A metallic and magnetorheological multi-panel, which is constituted in a sandwich structure that consists of a core (2) that consists of a viscoelastic resin (2) of adhesive nature, in which are found, distributed in an isotropic or anisotropic manner with a proportion in volume of more than 5%; and Magnetorheological particles of ferromagnetic material and with sizes between 10 nm and 10μ, said core (1) being arranged between a first skin ($1_1$) of metallic non-magnetic nature and a second skin ($1_2$) of metallic non-magnetic nature equal to or different from the first skin. The ratio of the thickness ($H_n$) of the core with respect to any of the thicknesses ($H_1$), ($H_2$) of the first ($1_1$) and second ($1_2$) skins is less than 0.1 and more than 0.01.

11 Claims, 1 Drawing Sheet

(51) Int. Cl.
  *B32B 15/082* (2006.01)
  *B32B 15/09* (2006.01)
  *B32B 15/18* (2006.01)
  *B32B 15/20* (2006.01)
  *B32B 27/20* (2006.01)
  *B32B 7/12* (2006.01)
  B32B 37/12 (2006.01)

(52) U.S. Cl.
  CPC ............ *B32B 15/095* (2013.01); *B32B 15/18* (2013.01); *B32B 15/20* (2013.01); *B32B 27/20* (2013.01); *B32B 37/12* (2013.01); *B32B 2250/40* (2013.01); *B32B 2264/102* (2013.01); *B32B 2264/105* (2013.01); *B32B 2307/102* (2013.01); *B32B 2307/208* (2013.01); *B32B 2307/56* (2013.01); *B32B 2309/105* (2013.01); *B32B 2311/00* (2013.01); *B32B 2605/00* (2013.01); *B32B 2605/08* (2013.01); *B32B 2605/18* (2013.01); *B32B 2607/00* (2013.01)

METAL AND MAGNETORHEOLOGICAL MULTI-PANEL

CROSS REFERENCE TO RELATED APPLICATION

This application claims the priority of Spanish Patent Application No. P201431113 filed on Jul. 24, 2014, which is incorporated by reference herein.

OBJECT OF THE INVENTION

The object of the invention is a metal panel with magnetorheological sandwich structure (SMRE) capable of high acoustic and vibrational damping with structural applications in very diverse sectors, such as lifts, automobiles, aviation, electrical appliances, construction, etc.

Control of the structural vibrations of mechanical systems is a fundamental aspect in ensuring their correct operation and their duration. Structural vibrations are a source of noise and of faults associated with mechanical fatigue to which the different components of the system are subjected. To control the unwanted vibrations and/or the noise, damping techniques are used which consist of configurations of mechanical elements or of materials designed to dissipate the mechanical energy.

Magnetorheological materials are intelligent materials that present a MR effect under a magnetic field. The MR effect consists of the modification of the rheological properties of the material instantaneously and reversibly on applying an external magnetic field. MR materials are composed of magnetic particles of micrometric size suspended in a non-magnetisable matrix. Since Rabinow in 1948 discovered the MR materials, they have evolved and today they are classified as MR fluids (MRF), MR gels and MR elastomers (MRE). The most common MR material is MRF, but these present certain disadvantages in comparison with the MRE. The most obvious advantage of the MREs is that they have a stable MR effect, as magnetic particles do not settle with time. Moreover, they maintain their geometric shape even when applying low fields; thus, they do not give sealing problems in the manufacture of sandwich structures. Therefore, MREs are a good option for manufacturing sandwiches with magnetorheological core.

Sandwich structures with a magnetorheological core (SMRE) can control and dissipate the vibrations in a wide range of frequencies of excitation and temperature, varying the rigidity and the damping of the structure in response to the intensity of the magnetic field applied. The applications of these adaptable sandwiches are numerous due to their advantages such as lightness, rigidity, strength and particularly, due to the capacity to modify their dynamic properties according to the required needs.

BACKGROUND OF THE INVENTION

Sandwiches of magnetorheological elastomer (SMRE), already known, are composed of aluminium skins due to their low damping and to their high rigidity as compared to MREs. Moreover, the relative magnetic permeability of aluminium is almost nil; thus, it does not affect the distribution and intensity of the magnetic field.

The core of the SMREs is composed mainly of a polymeric matrix and magnetic particles. The matrix used by the different authors to manufacture the MRE are Selleys Pty. Limited silicone with Polydimethylsiloxane fluid, Liyang Silicone Rubber, the inorganic polymer Bentonite Clay and synthetic oil and silicone Elastosil M4644. As magnetic particles, the most used is that of carbonyl iron (C5FeO5), with a diameter of more than 3 μm and in a proportion of 25-30% in volume of the MRE.

For the bonding of the polymeric matrix to the skins, an adhesive is used.

In the known SMREs the ratio of the skin thickness to the thickness of the core varies from 1.1% to 20%; that is, the core is always much thicker than the skins.

This configuration carries with it several problems.

The known SMRE are very expensive products.

They also present the problem of being excessively thick, which makes their application difficult precisely in the structures where, due to their high added value, such as in aviation or automobiles, their use is very desirable.

In structures that require a folding of the SMRE of more than 90° we have checked the tendency to peel off, due to the excessive thickness of the sandwich.

The need for the adhesive to join the core with the skins has as a result a more complex preparation of SMRE and consequently, a more expensive preparation.

These and other problems are solved by the SMRE that is the object of the invention.

DESCRIPTION OF THE INVENTION

The panel that is the object of the invention overcomes these problems, as it comprises a sandwich structure that is characterized in that it consists of a core that, in turn, consists of a viscoelastic resin of adhesive nature, in which there are, distributed uniformly in an isotropic or anisotropic manner with a proportion in volume of more than 5%; magnetorheological particles of ferromagnetic material with sizes from 10 nm to 10μ; said core being arranged between a first skin of non-magnetic metallic nature and a second skin of metallic non-magnetic nature the same as or different from the first skin.

It is also characterized in that the ratio of the thickness of the core with respect to any of the thicknesses of the first and second skins is less than 0.1 and more than $$0.01{:}0.01 \leq \frac{Hn}{H1\ \&\ H2} \leq 0.1.$$

Other configurations and advantages of the invention can be deduced from the following description, and from the subsidiary claims.

DESCRIPTION OF THE DRAWINGS

To better understand the object of the invention, represented in the attached figures is a preferential form of embodiment, subject to accessory changes that do not essentially alter it. In this case.

DESCRIPTION OF A PREFERENTIAL EMBODIMENT

Described below is an example of practical, non-limiting embodiment of this invention. Other modes of embodiment in which accessory changes are introduced that do not essentially alter it are in no way ruled out.

In figure the constitution of a SMRE can be seen, which consists of a core (2') of polymeric matrix in which magnetic particles of carbonyl iron are distributed of a size larger than 3 μm and spherical in shape.

It also consists of two skins ($1'_1$), ($1'_2$) of the same metallic, non-magnetic, aluminium or steel material; that is, both are made of aluminium and both are made of non-magnetic steel.

To join the core (2') to the skins ($1_1$), ($1'_2$) an adhesive is used (3).

The thickness of the core (H'4) is much greater than the thickness of the skins ($H'_1$) ($H'_2$); some manufacturers make $$\frac{(H'1) \& (H'2)'}{(H'n)}$$

between 1.1% and 3%, others reach up to 20%.

Figure 1:
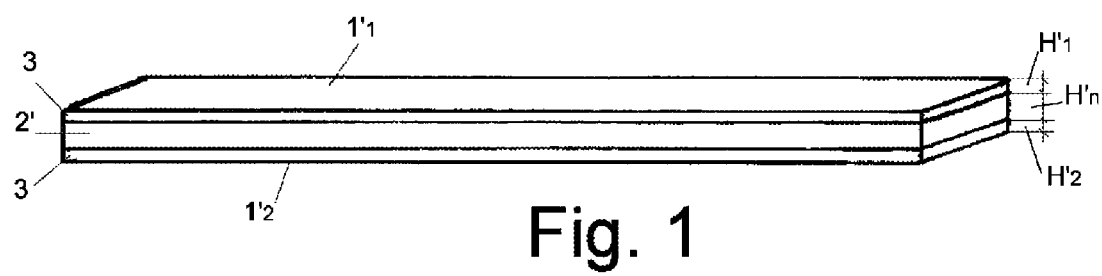
FIG. 1 is a schematic representation of a known magnetorheological sandwich (SMRE)
Figure 2:
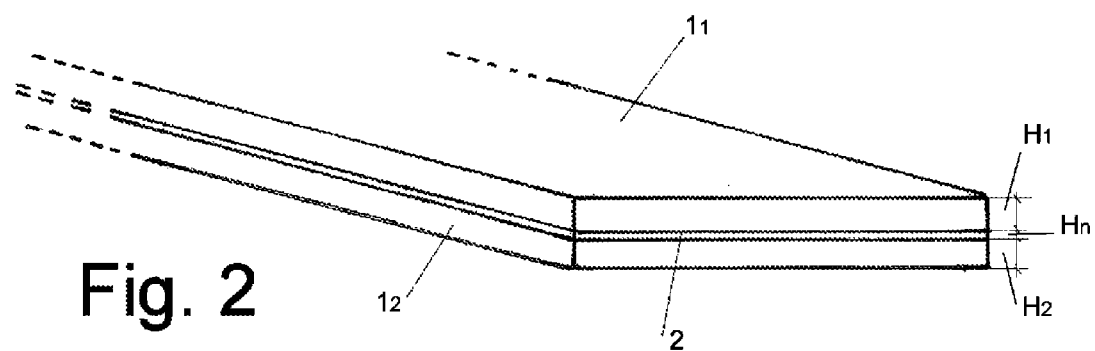
FIG. 2 is a schematic representation of a practical embodiment of the magnetorheological sandwich (SMRE) that is the object of the invention.

In FIG. 2 it is seen that in the constitution of the SMRE, object of the invention, the adhesive has disappeared (3). The core (2) is a viscoelastic resin, preferentially sensitive to pressure (PSA); for example, of polyester, acrylic, polyurethane, etc. So that its inherent viscous properties serve for direct adhesion to skins ($1_1$), ($1_2$).

In the core (2) distributed uniformly in isotropic or anisotropic manner magnetorheological particles of ferromagnetic material are found, preferentially of iron pentacarbonyl (C5FeO5) but could be of nickel, cobalt, etc.

Magnetorheological particles can be used (magnetisable) of different diameters (Ø) between 10 nm and 10μ, but preferentially spherical particles are used of a diameter (Ø) less than 1.3 μm: Ø≤1.3 μm, which is a diameter of less than half of the known particles currently used in the sandwiches.

The concentration of magnetorheological particles with respect to the core structure (2) can vary from 5% to 25%, but preferentially, by the results obtained in the laboratory, the concentration is between 10% and 20%, the magnetorheological effect being excessively weak below 5%.

The skins ($1_1$), ($1_2$) can be of the same or different metal, but always, the metal/s must be non-magnetic; for example, copper, zinc, aluminium, non-magnetic steel, such as non-ferritic stainless steel or especially, stainless austenitic steel.

We have verified in the laboratory that good results are obtained using one aluminium skin and another of steel, possibly because said metals having a different module of elasticity, they cause greater damping of the vibrations when the core MR works between two asymmetric skins.

The ratio of thicknesses of the skins ($H_1$), ($H_2$) with respect to the thickness of the core ($H_n$) is essential in the object of the invention, as this is what makes possible its application in the structures of aeroplanes or of automobiles.

Working with skins ($1_1$), ($1_2$) of thicknesses ($H_1$), ($H_2$) similar to the thicknesses ($H'_1$), ($H'_2$) used in the art known in the invention, core thicknesses ($H_n$) are used of much less than the known core thicknesses ($H'_n$)

$$0.05 \leq \frac{Hn}{H'n} \leq 0.5$$

and, in general, the ratio of thicknesses of the skins ($H_1$), ($H_2$) and of the core ($H_n$) is determined by $$0.01 \leq \frac{Hn}{H1 \& H2} \leq 0.1$$

EXAMPLES

| Skin 1 | | Core | Skin 2 | |
|---|---|---|---|---|
| Material | Thicknesses [mm] | Material | Material | Thicknesses [mm] |
| AISI 316 | 0.25 | AN601 | AISI 316 | 0.25 |
| AISI 316 | 0.25 | AN601 + 12% Fe | AISI 316 | 0.25 |
| AISI 316 | 0.25 | AN601 | Al | 0.5 |
| AISI 316 | 0.25 | AN601 + 12% Fe | Al | 0.5 |
| Al | 0.5 | AN601 | Al | 0.5 |
| Al | 0.5 | AN601 + 12% Fe | Al | 0.5 |

The core thicknesses vary between 0.02 mm and 0.01 mm, with a skin thickness of 0.25 mm; and between 0.04 mm and 0.01 mm, with a skin thickness of 0.5 mm.

The skins-core bond is made by the continuous process of coil coating, applying the adhesive with rollers.

To obtain the dissipation factor of each mode, the HPB Half-Power Bandwidth method is applied. This method consists of the following: In each resonance frequency $f_n$ the frequencies at which the module of transferability 3.01 db falls are calculated and $\Delta f_n$ is determined. With the experimental data obtained of $f_n$ and $\Delta f_n$ of each mode the dissipation factor is obtained.

$$\eta = \frac{\Delta fn}{fn}$$

Thus:
$f_n$: resonance frequency of mode n (Hz)
$\Delta f_n$: HPB of the mode n (Hz)
The particles are of iron pentacarbonyl (C5FeO5) of different sizes, between 10 nm and 10μ
The core is of Koratac resin AN 601
AISI 316 is austenitic stainless steel.
Al is of aluminium.

In the analysis of the first frequency for an applied frequency between 10 and 50 Hz it is observed that the dissipation factor of sandwich can increase by 30% on applying magnetic field with respect to the same sandwich with non-MR core.

It should be noted from the results that the magnetic field modifies the rigidity and the damping of all the sandwiches analysed. The structure loses rigidity at low frequencies and in general increases the damping, especially in the sandwich with aluminium and steel skins.

The materials, dimensions, proportions and in general, those other accessory or secondary details that do not alter, change or modify the essential proposal can be variable.

The terms in which this report is written are a true reflection of the object described, and must be taken in its broadest sense, and never in a limiting manner.

The invention claimed is:
1. A metallic and magnetorheological multi-panel, comprising:
(a) a first skin of non-magnetic metal having a thickness ($H_1$);
(b) a core having a thickness ($H_n$), comprising:

(i) an adhesive viscoelastic resin, and
(ii) magnetorheological particles of ferromagnetic material with sizes between 10 nm and 10 μm, wherein the magnetorheological particles are distributed uniformly in an isotropic or anisotropic manner, and comprise at least 5% of the core by volume;

(c) a second skin of non-magnetic metal having a thickness ($H_2$); and wherein the ratio of the thickness ($H_n$) of the core with respect to any of the thicknesses ($H_1$), ($H_2$) of the first and second skins is less than 0.1 and more than 0.01 in accordance with the inequality:

$$0.01 \le \frac{H_n}{H_1 \ \& \ H_2} \le 0.1$$

and
wherein the core is arranged between the first skin and the second skin, and wherein the thickness ($H_n$) of the core is at least 10 μm; and when a magnetic field is applied it modifies the rigidity and damping of the multi-panel.

2. The metallic and magnetorheological multi-panel according to claim 1, wherein the viscoelastic resin is of polyester and/or acrylic and/or polyurethane base.

3. The metallic and magnetorheological multi-panel according to claim 1, wherein the first and second skin are of aluminum.

4. The metallic and magnetorheological multi-panel according to claim 3, wherein the thickness ($H_1$) of the first skin is equal to the thickness ($H_2$) of the second skin.

5. The metallic and magnetorheological multi-panel according to claim 3 wherein the thickness ($H_1$) of the first skin is different from the thickness ($H_2$) of the second skin.

6. The metallic and magnetorheological multi-panel according to claim 1, wherein the first and second skin are of non-ferritic stainless steel.

7. The metallic and magnetorheological multi-panel according to claim 6, wherein the thickness ($H_1$) of the first skin is equal to the thickness ($H_2$) of the second skin.

8. The metallic and magnetorheological multi-panel according to claim 6, wherein the thickness ($H_1$) of the first skin is different from the thickness ($H_2$) of the second skin.

9. The metallic and magnetorheological multi-panel according to claim 1, wherein the first skin is made of aluminum and the second skin is made of non-ferritic stainless steel.

10. The metallic and magnetorheological multi-panel according to claim 9, wherein the thickness ($H_1$) of the first skin is equal to the thickness ($H_2$) of the second skin.

11. The metallic and magnetorheological multi-panel according to claim 9, wherein the thickness ($H_1$) of the first skin is different from the thickness ($H_2$) of the second skin.

* * * * *